Dec. 11, 1951 N. A. CHRISTENSEN 2,577,999
REVERSING VALVE
Filed Dec. 15, 1945 2 SHEETS—SHEET 1

INVENTOR.
NIELS A. CHRISTENSEN.
BY
Bates, Teare & McBean
Attorneys.

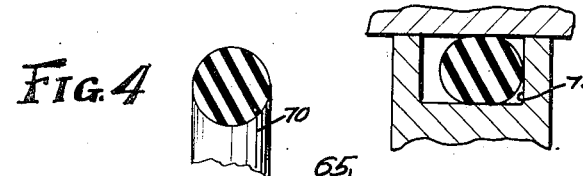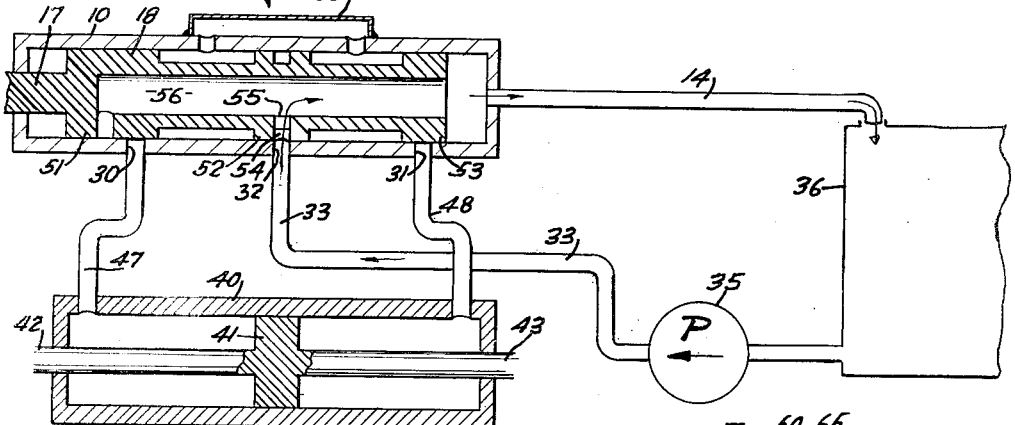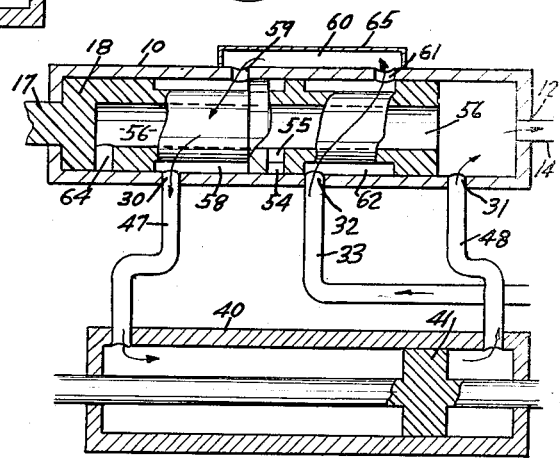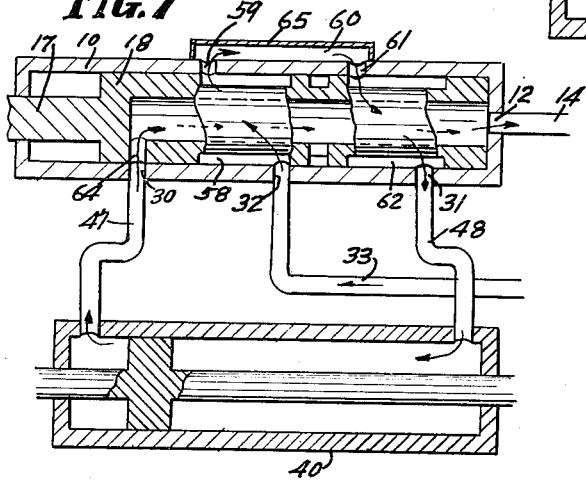

Patented Dec. 11, 1951

2,577,999

UNITED STATES PATENT OFFICE 2,577,999

REVERSING VALVE

Niels A. Christensen, South Euclid, Ohio

Application December 15, 1945, Serial No. 635,277

4 Claims. (Cl. 251—76)

This invention relates to valve structures and particularly to a valve device that is adaptable for use as a reversing valve to control and direct the flow of fluid to a working cylinder or any device in which fluid under pressure is adapted to be used as a source of power.

At the present time there is a great demand, particularly in aircraft construction, for a reversing valve for controlling the operation of a double-ended power cylinder and particularly for a device which will operate satisfactorily without leakage while being held at a neutral position.

In aircraft manufacture it is often desirable to mount in the cockpit within reach of the pilot a valve for controlling the flow of fluid under pressure to a remotely positioned working device as, for instance, to pressure cylinders for operating landing gear rudders, bomb drops, variable pitch propellers and other devices and equipment which require precise and positive control. It is also desirable to relieve the source of pressure, as for instance, a pressure pump, of strains when there is no flow of fluid to the working device.

An object of the present invention is to provide a reversing valve mechanism which will be simple in construction and which will operate highly satisfactorily to resist leakage under high pressure particularly while held in a neutral position at which time the valve will automatically provide a pressure relief for the source of fluid pressure, and which valve may be inexpensively manufactured, economical in operation, and yet permit flexibility in the control of the fluid used for operating the working device.

Other objects and advantages of the present invention will become more apparent from the following description, reference being had to the accompanying drawings in which there is illustrated a preferred form of the invention. The essential features of the invention will be summarized in the claims.

Figure 1:
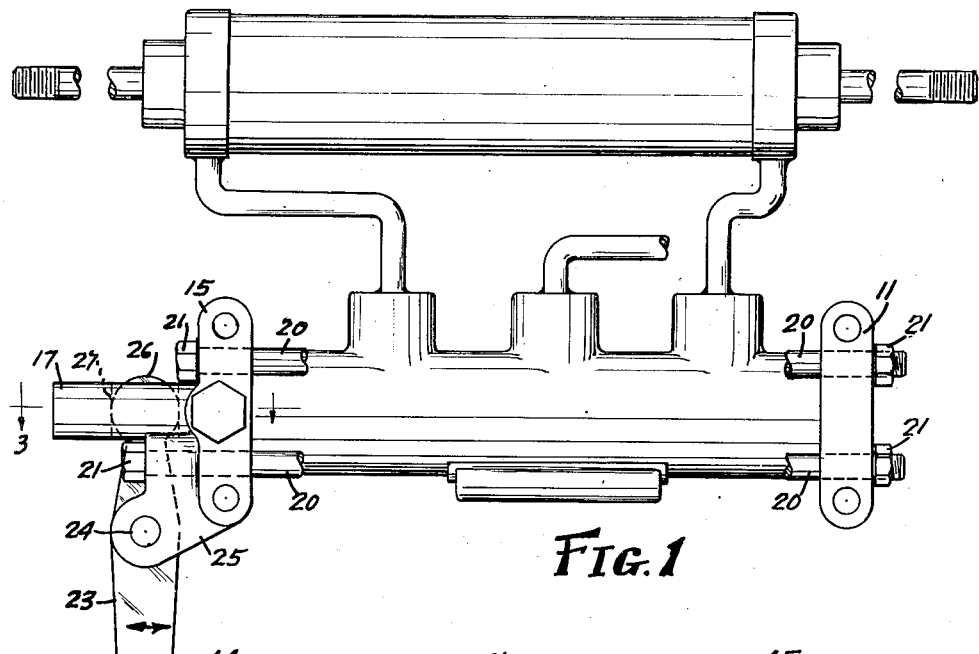
Figure 2:
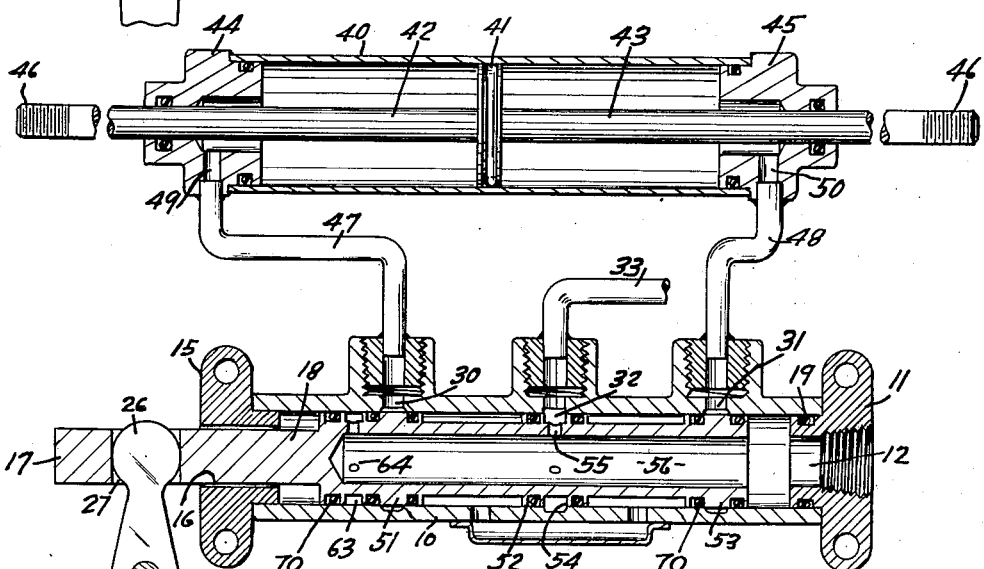
Figure 3:
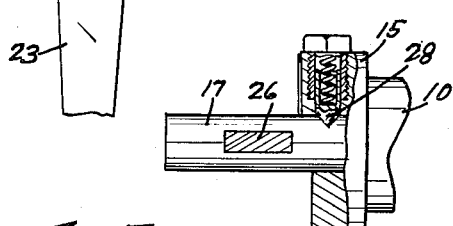

In the drawings, Fig. 1 is an elevation of a valve assembly embodying one type of working device; Fig. 2 is a horizontal section taken through the axes of the structures of Fig. 1 and parallel therewith; Fig. 3 is a fragmentary vertical section, the plane of the section being indicated by the correspondingly numbered lines on Fig. 1; Fig. 4 is a sectional view through a packing ring that is used in the valve mechanism; Fig. 5 is a sectional view illustrating the packing ring assembled in a piston groove; Fig. 6 is a diagrammatic view showing the valve in a neutral or off position; Fig. 7 is a diagrammatic view illustrating the valve in one working position; and Fig. 8 is a sectional view diagrammatically illustrating the valve in a different working position.

The present invention includes a valve device comprising a cylinder 10 one end of which has a head 11 provided with an aperture 12 extending therethrough to receive a conduit 14 for exhausting fluid from the cylinder, and the other end of which has a head 15 provided with an aperture 16 through which an operating rod 17 of a control member 18 is freely slidable. Each head is provided with a boss-like formation extending into the cylinder and the head 11 is provided with a groove to receive packing 19 to insure a fluid-tight seal between the wall of the cylinder and the head. The heads are held in position against the ends of the cylinder by bolts or threaded rods 20 which pass through the heads and are provided with nuts 21 whereby the heads may be drawn tightly into contact with the ends of the cylinder.

The control member 18 is arranged for manual operation. As shown in the drawings, an operating lever 23 is pivoted intermediate its ends, as at 24, to a bracket formation 25 formed intergrally with the head 15. One end 26 of the operating lever, engages the walls of a slot 27 formed in the rod 17 which may be secured to, or formed integrally with the control member 18. If desired, a spring pressed detent 28 may be mounted in the head 15 and arranged to engage a notch formed in the rod 17 to retain the rod in its off or neutral position.

In the drawings, the cylinder 10 is shown as being provided with a pair of spaced delivery ports 30 and 31, together with an intermediately positioned inlet port 32. The port 32, as shown, is arranged to be connected by a conduit 33 with a suitable source of fluid pressure such, as for instance, a pump 35 which draws fluid from a storage tank 36. Fluid flowing from the valve is exhausted through the port 12 and returns, through the conduit 14, to the storage tank.

The conduits 30 and 31 are illustrated as establishing communication between the valve and a working device. Such working device is illustrated as comprising a cylinder 40 having a piston 41 carrying rods 42 and 43 which project through heads 44 and 45 respectively at opposite ends of the cylinder. These heads may be held in position on the cylinder by means such as the rods 20 heretofore described in connection with the control cylinder, and the cylinder may be anchored against movement in any convenient way. Any device desired to be operated may be connected to one or both of the piston rods 42 or 43. As illustrated, each rod is threaded for this purpose. Communication between opposite ends of the working cylinder 40 and the valve is made through conduits 47 and 48 which extend between the valve delivery ports 30 and 31, heretofore described, and passageways 49 and 50 formed in the heads 44 and 45 respectively.

The control valve of the present invention is particularly concerned with selectively admitting fluid under pressure to one end of the working cylinder 40 and exhausting the other end of the cylinder, and to the relieving of the pressure in the pressure line 33 when the valve is in a neutral position to thereby relieve the pump from its work. This facilitates the use of a valve in mechanism wherein the fluid pressure supply is derived from an individual pump or, by a hand pump and an accumulator, and eliminates the necessity of using complicated spring-loaded safety valves in the fluid pressure system.

As shown in the drawings, the control member 18 comprises a piston-like formation having three lands 51, 52 and 53 arranged, when the valve is in its neutral position as shown in Figs. 2 and 6. When the control member is in its neutral position the lands 51 and 53 close the delivery ports 30 and 31, and an annular groove 54 formed in the central land 52 is in alignment with the pressure or inlet port 32. This groove is in communication by means of radially extending ports 55 with an axial extending passageway 56 formed in the control member 18, which passageway is in constant communication with the exhaust port 12 in the head 11. Thus, with the control member in the position illustrated in Figs. 2 and 6, namely, its neutral position, fluid cannot pass to or from the operating cylinder 40, and the pump 35 or other source of fluid supply is in open communication with the exhaust conduit 14, thereby relieving the pump of any back pressure and eliminating the loss of power that would otherwise be required were the pump to remain operating under static pressure conditions.

When it is desired to move the piston 41 of the operating cylinder 40 to the left, fluid under pressure is admitted to the right-hand end of the cylinder 40 through the conduit 48, and the fluid from the left-hand end of the cylinder 40 is exhausted through the conduit 47. The setting of the valve mechanism to accomplish such movement of the piston 41, is shown in Fig. 7, in which position the control member 18 has been moved to the extreme right-hand end of its cylinder 10. In this position of the control member fluid from the pressure conduit 33 passes through the port 32 into an elongated groove 58 of the control member which groove is positioned between the lands 51 and 52. From the groove 58, the fluid under pressure flows through a port 59 in the wall of the cylinder 10 thence through a passageway 60 and a port 61 back into the cylinder and into an elongated groove 62 formed in the control member between the lands 52 and 53, which groove (when the control member is in its right-hand position, as shown in Fig. 7) is in communication with the delivery port 31 and the conduit 48. Thus, fluid flows to the right-hand end of the cylinder 40.

While fluid pressure is being applied to the right-hand end of the operating cylinder 40, the fluid from left-hand end of said cylinder passes through the conduit 47, through the port 30 to an annular groove 63 formed in the land 51 and which is in constant communication, as by a radial passageway 64, with the axial passageway 56 and the exhaust port 12 of the valve structure. For simplicity of manufacture the passageway 60 may comprise a metal box-like formation 65 which may be secured to the external wall of the cylinder as, for instance, by welding.

When it is desired to move the piston 41 of the operating cylinder 40 to the right, the control member 18 is moved to the left. The setting of the control member for this operation is diagrammatically shown in Fig. 8. In such position of the control member 18, fluid under pressure flows from the inlet or pressure conduit 33 into the elongated groove 62, thence through the port 61, the passageway 60, and the port 59, to the elongated groove 58 which, in this position of the control member 18, is in communication with the delivery port 30 and the conduit 47, thus admitting fluid under presure to the left-hand end of the piston 41.

As the piston 41 moves to the right under impulse of the fluid pressure in the left-hand side of the cylinder 40, the fluid in the right-hand side of the cylinder discharges through the delivery conduit 48 and the port 31 directly into the cylinder 10 at the right-hand end of the control member 18, and thus exhausts through the exhaust port 12 and the conduit 14.

To maintain fluid-tight seal between the component parts of the control member 18 and the wall of the cylinder 10, the present invention utilizes packing rings 70. As shown in Fig. 2, these packing rings are so arranged that when the valve is in its neutral position, a pair of rings positioned on each of the lands 51 and 53, lie at either side of the respective ports 30 and 31, thus preventing any seepage of fluid either to or from the operating cylinder 40. Similarly, a pair of packing members are provided with central land, one ring being disposed at either side of peripheral groove 54 heretofore described, thus preventing seepage of fluid from one portion of the cylinder to another. The land 51 is provided with a third sealing ring 70 which, together with one of the rings heretofore described in connection with the land 51, embraces the peripheral groove 63 on such land. Each of the packing rings 70 are substantially identical. These rings are shown in Fig. 4 as being normally circular in cross-section and each comprises a complete annulus. A groove into which a ring 70 is adapted to be seated is indicated at 75 in Fig. 5. This groove has a depth which is less than the normal cross-sectional diameter of the ring by a distance sufficient to cause the ring to assume an elliptical shape when the piston containing it is inserted within its cylinder, and is of a length greater than the longest dimension of the compressed ring whereby, whenever the piston is reciprocated in the cylinder, the ring is permitted to move slightly with respect to the piston, such movement being sufficient to knead the packing material and keep it in a satisfactory working condition.

A particular advantage of the present invention is the fact that at any time the valve may be quickly moved from an operating position to a neutral position while maintaining the operating pressure on the working cylinder and when in the neutral position the valve acts to relieve the pump from any working or back pressures, thus avoiding the necessity of utilizing complicated pressure relief mechanism to safeguard the pump, which due to the high pressures frequently utilized in devices of this type, are apt to fail. In addition, the valve may be manipulated so as to hold the piston locked against movement in any desired position of travel thereof with relation to the working cylinder, at the will of the operator, by moving the control valve into the neutral position.

I claim:

1. A valve comprising a cylinder having four ports spaced axially in its wall and intermediate the ends thereof together with an exhaust port in one end thereof, two of said ports being interconnected by a fluid conduit, a member slidably mounted in said cylinder and having a pair of peripheral grooves in its surface of such length that when the member is in one position one of said grooves establishes communication between one of said interconnected ports and a third port while the other groove establishes communication between the other of said interconnected ports and a fourth port, said member having an internal space communicating with the exhaust port and a passageway from said internal space to the exterior of the member, said passageway being adapted to register with said third port in another position of said member.

2. A valve comprising a cylinder having at least four ports spaced axially in its wall and intermediate the end thereof, together with an exhaust port, two of said first-named ports being interconnected by a fluid passageway, a member slidably mounted in said cylinder and adapted to occupy two positions therein, in one of which positions communication is established between one of said interconnected ports and a third port, while communication is established between the other of said interconnected ports and a fourth port, said member having an internal passageway adapted to communicate at one end with the exhaust port and at the other end with said fourth port in another position of said member.

3. A valve comprising a cylinder having at least four ports spaced axially in its wall and intermediate the ends thereof, and an exhaust port, two of the first-mentioned ports being interconnected by a fluid passageway, and one of said first-named ports comprising a supply port, a member slidably mounted in said cylinder and having in its surface a pair of peripheral grooves spaced apart and at such axial length that when the member is in one position, one of said grooves establishes communication between one of said interconnected ports and a third one of said ports, while the other groove establishes communication between the other of said interconnected ports and a fourth one of said ports, said member having a groove intermediate of the groove first-mentioned and adapted when the member is in a third position to register with the supply port, and said member having a passageway adapted to put said intermediate groove in communication with the exhaust port.

4. A reversing valve comprising a cylinder having side and end walls, five ports spaced axially in the side wall and intermediate the ends thereof, and having an exhaust port in an end wall, two of said side wall ports being interconnected by a fluid passageway, a member axially slidable in said cylinder and having a pair of peripheral grooves in its surface, said grooves being so arranged that when said member is in one position one of said grooves establishes communication between the first one of said interconnected ports and a third port, while the other groove establishes communication between the second of said interconnected ports and a fourth port, said member in such position having an end thereof terminating short of a fifth port, whereby the fifth port is placed in communication with the exhaust port which is in the adjacent end wall of the cylinder, and wherein in another position of said member said first-mentioned groove establishes communication between said first and fifth ports, while said second groove establishes communication between the second of said interconnected ports and said third port, and while said fourth port is in communication with the exhaust port, said member having an internal space communicating with the exhaust port and a passageway from said internal space to the exterior of the member, said passageway being adapted to register with said fourth port whereby communication is thus established between said fourth port and the exhaust port, and wherein in a third position of said member all communication between the third and the fourth and fifth ports is severed.

NIELS A. CHRISTENSEN.

REFERENCES CITED

The following references are of record in the file of this patent:

UNITED STATES PATENTS

| Number | Name | Date |
|---|---|---|
| 1,692,771 | Ferris | Nov. 20, 1928 |
| 1,917,316 | Naab | July 11, 1933 |
| 2,354,336 | Sloane | July 25, 1944 |